US009495605B2

(12) United States Patent
Eckel et al.

(10) Patent No.: US 9,495,605 B2
(45) Date of Patent: Nov. 15, 2016

(54) METHOD AND APPARATUS FOR THE DETECTION OF DIGITAL WATERMARKS FOR INSTANT CREDENTIAL AUTHENTICATION

(71) Applicant: L-1 Secure Credentialing, LLC, Billerica, MA (US)

(72) Inventors: Robert Andrew Eckel, Andover, MA (US); Mohamed Lazzouni, Northborough, MA (US)

(73) Assignee: MorphoTrust USA, LLC, Billerica, MA (US)

( * ) Notice: Subject to any disclaimer, the term of this patent is extended or adjusted under 35 U.S.C. 154(b) by 258 days.

(21) Appl. No.: 13/777,483

(22) Filed: Feb. 26, 2013

(65) Prior Publication Data

US 2013/0223674 A1 Aug. 29, 2013

Related U.S. Application Data

(60) Provisional application No. 61/603,632, filed on Feb. 27, 2012.

(51) Int. Cl.
*G06K 9/00* (2006.01)
*G06K 9/20* (2006.01)
(Continued)

(52) U.S. Cl.
CPC ............. *G06K 9/2063* (2013.01); *G07D 7/004* (2013.01); *G07D 7/0046* (2013.01); *G07D 7/128* (2013.01); *G07C 9/00031* (2013.01)

(58) Field of Classification Search
CPC ................ G07C 9/00031; G07D 7/002; G07D 7/128;G07D 7/004; G07D 7/0046; G07D 7/0053; G07D 7/006; G07D 7/0066; G07D 7/0073; G07D 7/008; G07D 7/0086; G06K 9/2063; G06T 2201/005; G06T 2201/0064; G06T 2201/0065
See application file for complete search history.

(56) References Cited

U.S. PATENT DOCUMENTS 5,432,864 A * 7/1995 Lu ...................... G06K 9/00275 340/5.83
5,997,345 A * 12/1999 Inadama ............. G06K 7/0013 439/489

(Continued)

FOREIGN PATENT DOCUMENTS

EP 2302599 A1 3/2011
KR 20050103977 A 11/2005

OTHER PUBLICATIONS

International Search Report and Written Opinion, PCT/US2013/027802, dated Jun. 3, 2013, 9 pages.

(Continued)

*Primary Examiner* — Timothy Choi
(74) *Attorney, Agent, or Firm* — Fish & Richardson P.C.

(57) ABSTRACT

A portable hand-held device for use in authenticating documents includes a camera for capturing images from the document to be authenticated as well as on-board computer-implemented instructions to capture and analyze Digitally Watermarked images and output an indication as to whether the document is authentic or not authentic.

14 Claims, 5 Drawing Sheets

(51) Int. Cl.

| | |
|---|---|
| ***G07D 7/00*** | (2016.01) |
| ***G07D 7/12*** | (2016.01) |
| *G07C 9/00* | (2006.01) |

(56) References Cited

U.S. PATENT DOCUMENTS

| | | | | |
|---|---|---|---|---|
| 7,694,887 | B2 | 4/2010 | Jones et al. | |
| 2002/0193094 | A1* | 12/2002 | Lawless et al. | 455/407 |
| 2004/0213437 | A1* | 10/2004 | Howard | G06F 17/30011 382/115 |
| 2007/0291988 | A1 | 12/2007 | Karimov et al. | |
| 2008/0116276 | A1 | 5/2008 | Lo | |
| 2008/0149713 | A1* | 6/2008 | Brundage | 235/435 |
| 2010/0038514 | A1* | 2/2010 | Yu | A47B 23/044 248/449 |
| 2010/0078290 | A1* | 4/2010 | Chang | 194/206 |
| 2011/0317875 | A1 | 12/2011 | Conwell | |

OTHER PUBLICATIONS

European Search Report dated Oct. 6, 2015 from corresponding European Application No. 13755589.2, 3 pages.

* cited by examiner

METHOD AND APPARATUS FOR THE DETECTION OF DIGITAL WATERMARKS FOR INSTANT CREDENTIAL AUTHENTICATION

RELATED APPLICATIONS

This application claims priority to U.S. Patent Application No. 61/603,632, filed Feb. 27, 2012, the entirety of which is herein incorporated by reference.

FIELD OF THE INVENTION

The present invention relates to the field of secure credential authentication and, more particularly, to a method and handheld system for detecting and analyzing digital watermarks (DWM) contained in a credential document for authentication. Once the DWM has been detected and analyzed, the results of such detection and analysis may cause the system to trigger an alert or other message to the user of the system as well as, optionally, governmental or other authorities wirelessly from the handheld system.

BACKGROUND

A credential is an attestation of qualification, competence, or authority issued to an individual by a third party with a relevant or de facto authority or assumed competence to do so. Counterfeiting of credentials is a constant and serious problem, irrespective of the type of credential. A great deal of effort goes into finding methods to reduce or prevent counterfeiting. In general, the greater the perceived value of the credential, the greater the problem with counterfeiting and the greater the lengths to which the issuer of the credential must go to prevent fraud.

Credentials that simply establish a person's identity are very widely used. Documentation usually consists of an identity card (sometimes a credential that is also used for other purposes, such as an automobile driver's license), a badge (often machine-readable), etc., issued by a trusted third party after some form of identity verification. Many identification documents use photographs to help ensure their association with their legitimate holders. Some also incorporate biometric information, passwords, PINS, and so on to further reduce the opportunities for fraud. Identification credentials are among the most widely counterfeited credentials.

As such, there is a great need for methods of reducing and preventing counterfeiting of secure credentials.

SUMMARY

While it is known to detect and analyze digital watermarks, the present invention provides a system and method of real time verification of identification documents having digital watermarks in a portable, hand-held device, which may be a smart phone or hand-held tablet using a simple hand gesture or waving the reader device at the card or vice versa. The smart phone or tablet may be equipped with downloaded software, which will permit the tablet and/or smart phone's camera to detect one or more digitized watermarks, analyze the watermark(s) using the downloaded software, and determine whether the identification document is authentic. It may then use the determination that the identification document is not authentic to trigger an alarm followed by a series of actions.

DETAILED DESCRIPTION

Embodiments of the invention provide techniques for the use of a digital watermarking detection and reading device that will allow fast authentication of a secure credential that contain embedded chrominance-based DWM signals. Other embodiments are within the scope of the invention.

A digital watermark (DWM) is embedded information in a digital signal such as pictures, audio, video or any other digital form of media. DWMs may be used, for example, to authenticate media (e.g. authenticate an identity document), identify the owner of media (e.g. a copyright), or communicate secret or hidden messages (e.g. steganography). If the signal is copied the DWM is also carried in the copy. A signal may carry several different DWMs at the same time. A DWM payload is the information or data embedded using a DWM.

A DWM may be visible, such as a text or logo embedded in an image, or invisible where the information cannot be perceived by the naked eye but may be detected by a suitable device. DWMs differ from metadata in that the data is carried directly in the signal. An objective of DWM is to attach ownership or information to a signal in a way that is difficult to remove. Digital watermarking systems and techniques are discussed in U.S. Pat. No. 7,694,887, entitled "Optically Variable Personalized Indicia for Identification Documents", assigned to L-1 Secure Credentialing, Inc., the entire contents thereof which are incorporated herein by reference.

In regards to images, the DWM may be luminance-based. The DWM signal is embedded in signal intensity. Another form of DWM is chrominance-based. Chrominance-based DWMs embed information in a signal using values in the entire color spectrum. Chrominance-based DWMs are available from a number of sources, including a product named "Chroma", available from Digimarc Corporation of Beaverton, Oreg. Luminance-based DWMs are also commercially available from a number of sources including Digimarc's "Classic" watermarking technology, again available from Digimarc Corporation of Beaverton, Oreg. Chrominance-based DWMs provide a number of advantages over luminance-based. Because the entire color spectrum is employed, the chrominance-based DWM signal can be stronger, less perceptible and more robust than a luminance-based DWM signal. Additionally, the integrity of the DWM is improved over the lifetime of a printed digital image, such as a credential, as chrominance-based DWMs are less susceptible to aging degradation.

Figure 1:
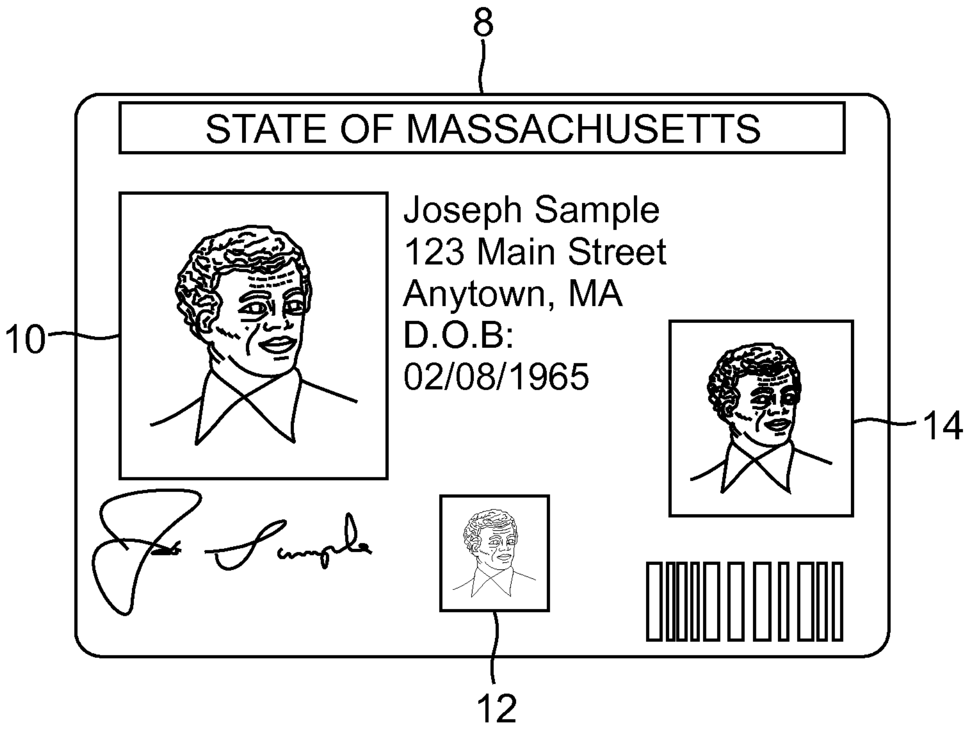
FIG. 1 illustrates an identification document (ID) with one or more digital watermarks.

Secure credentials can take many forms ranging from ID-credit card size to ID 3 passport size. One example is a driver's license or other identification document. DWMs may be placed on the document to reduce or prevent counterfeiting of the document and to help ensure the documents association with its legitimate holders. Example information embedded as a DWM in a driver's license may include information about the issuer, owner's name, owner's date of birth, card type, license number, document number, etc. FIG. 1 illustrates an example of the information which may be embedded as a DWM in a driver's license. FIG. 1 illustrates an identification (ID) document 8 in accordance with one aspect of the present invention, including an image 10 that is viewable under normal viewing conditions. The document also includes a ghost image 12 which may be a ghost version of image 10, and can be a color or half tone version of image 10. The ghost image is also preferably visible under normal conditions.

Covert image 14 (which is shown in FIG. 1 as being visible for illustrative purposes only), preferably corresponds to image 10 and is preferably an image not visible under normal viewing conditions. By way of example only, a covert image may be one which is visible under UV lighting.

One or more digital watermarks may be embedded in the covert image 14 or in any other area of the ID card 8 as desired.

Digital watermarking systems typically have two primary components: an encoder that embeds the digital watermark in a host media signal, and a decoder that detects and reads the embedded digital watermark from a signal suspected of containing a digital watermark (a suspect signal). The encoder embeds a digital watermark by altering the host media signal. The reading component analyzes a suspect signal to detect whether a digital watermark is present. In applications where the digital watermark encodes information, the reader extracts this information from the detected digital watermark. The reading component can be hosted on a wide variety of tethered or wireless reader devices, from conventional PC-connected cameras and computers to fully mobile readers with built-in displays. By imaging a watermarked surface of the card, the watermark's "payload" can be read and decoded by this reader.

Returning to the present implementation, in accordance with this embodiment of the invention, a digital watermark is embedded in the covert image 14. For purposes of illustration, assume that the cover image 14 is a UV image. A watermark detector can only read the covert watermark if the host identification document 8 is subject to appropriate UV stimulation at the same time that the host identification document is presented to the watermark detector. This provides additional security to the identification (ID) document 8, because even if a counterfeiter is able to access UV inks to print a bogus cover image 14, the bogus covert image 14 will not contain the embedded digital watermark. Of course, mere photocopying or scanning of the identification document 8 will similarly frustrate the counterfeiter, who will be unable to reproduce, through scanning or photocopying, either the covert image 14 or the watermark contained therein.

In one embodiment, the watermark embedded in the covert image 14 may include a payload or message. The message may correspond, e.g., to the ID document number, printed information, issuing authority, biometric information of the bearer, and/or database record, etc. The watermark embedded in the covert image 14 may also include an orientation component, to help resolve image distortion such as rotation, scaling and translation. In at least one embodiment of the invention, we embed two or more watermarks in the OVD image.

In addition, the information may be broken into a primary DWM and a secondary DWM payload. The primary is embedded in the portrait of the identity document. The secondary is embedded in the background of the document. The two DWM payloads may contain overlapping or duplicate information. This will extend the longevity of the reading after the card has been used for several years, as a strategy to maintain robustness, error correction and managing severe service. By providing duplicate information in spaced-apart portions of the identity document, if one portion of the document becomes unreadable for some reason (wear or smudging) the same information will be readable from another portion of the document.

Furthermore, data embedded in a DWM may be further encoded or encrypted to prevent counterfeiting.

Figure 2:
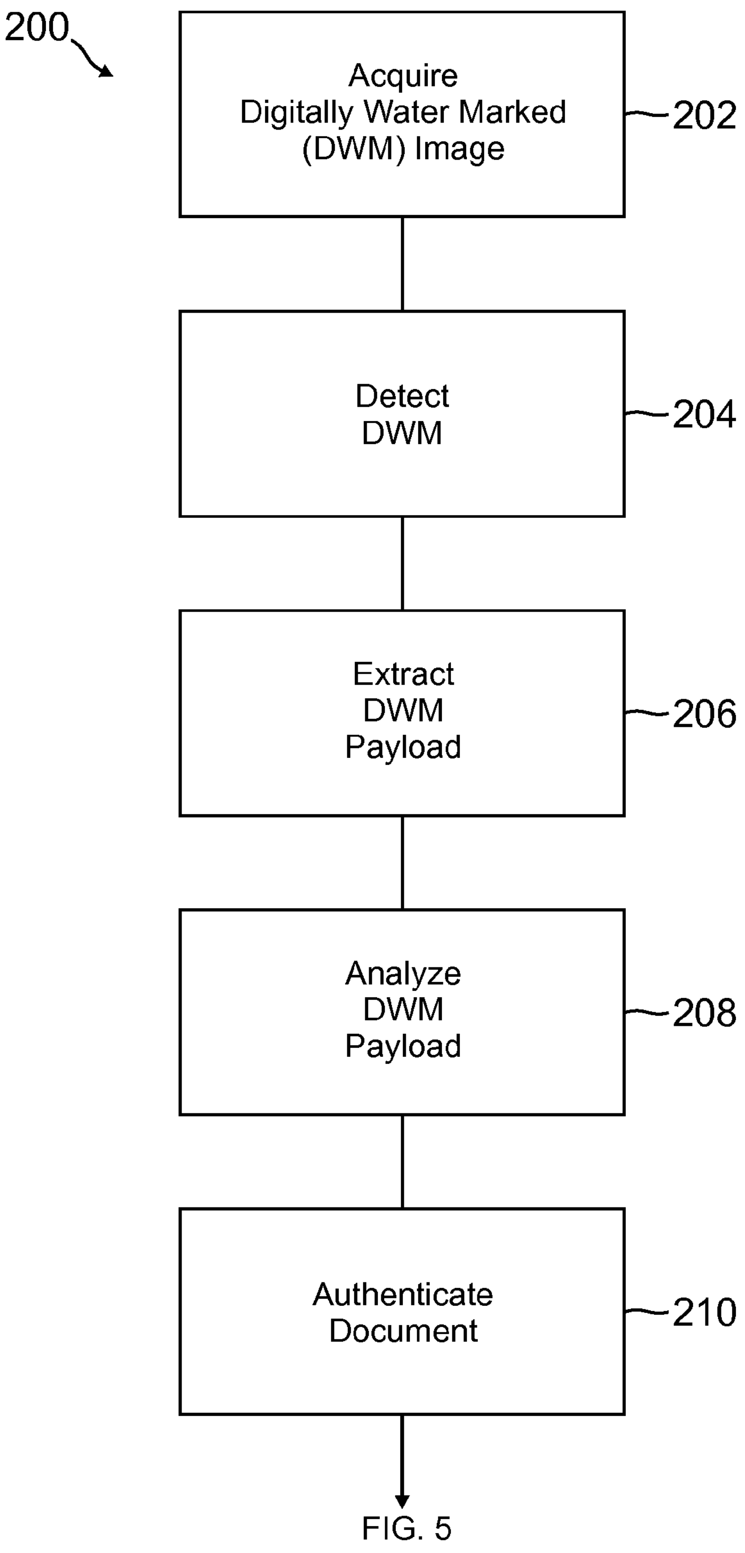
FIG. 2 is a flow chart illustrating the steps by which a digital watermark(s) is captured and analyzed.

FIG. 2 is a flow chart, which illustrates processing operations 200 for authentication of a secure credential containing embedded DWM signals.

In Step 202, the step of acquiring the DWM may comprise digitally capturing a DWM image using a visual inspection device and processing hardware.

Figure 3:
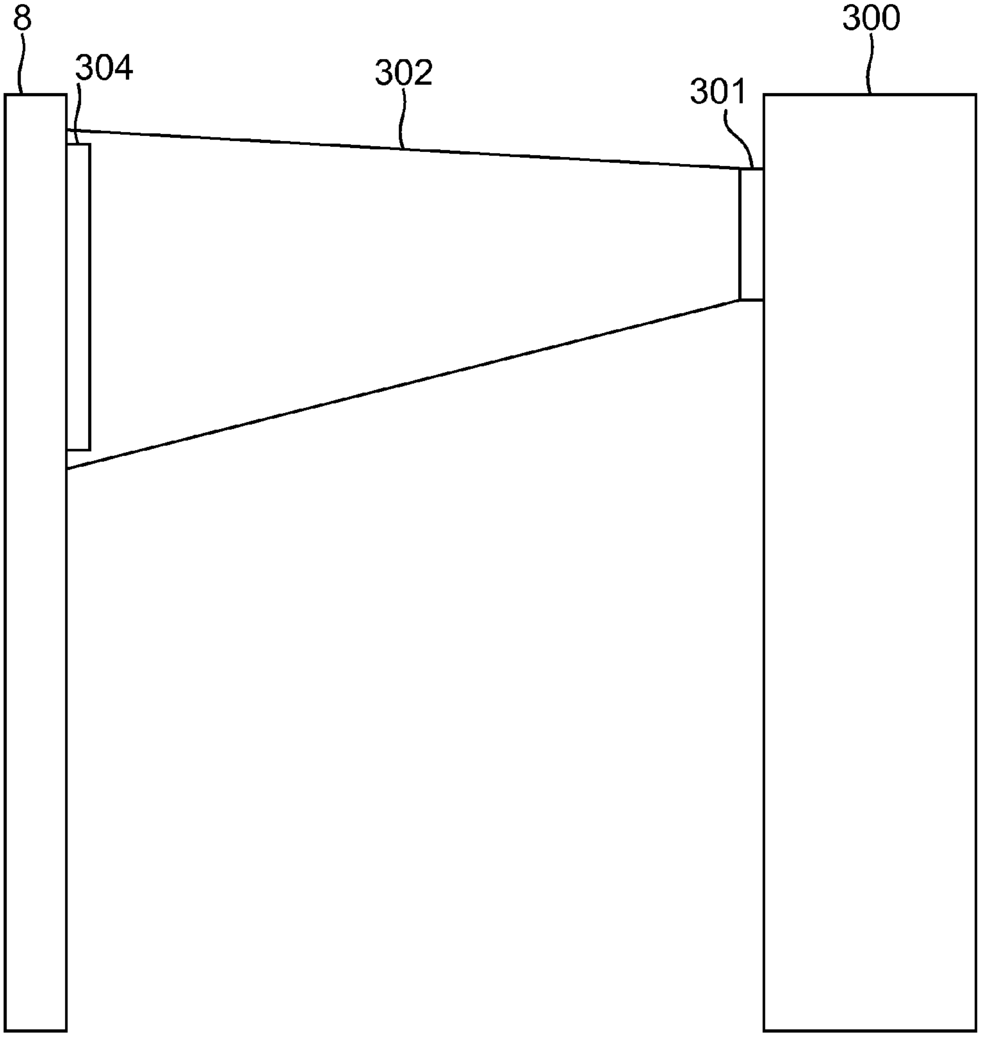
FIG. 3 illustrates the mechanisms for the interaction of an ID document and an image capture device.

FIG. 3 illustrates the step of digitally capturing a DWM image. DWM media on ID document 8 is placed within the field of view of visual inspection device field 300, which may be a smart phone or similar device such as a tablet device. The device has a field of view 302. The visual inspection device focuses on the DWM media 304. The focusing may be performed using an optical lens contained in a camera 301 on the smart phone. The resolution of the visual device is configured to insure sufficient image capture quality. An image is acquired via the visual inspection device 300. Regions of interest are identified within the image which may contain DWMs. Depending on the extent of field of view 302, the ID document may be stationary or moved within the field of view of camera 301. The regions of interest are extracted from the image and analyzed using the software that has been downloaded into the visual inspection device. The software then analyzes the one or more DWMs and determines whether the document is authentic, providing a "GO-NO-GO" output on the screen of the visual inspection device. For example, when the device is a smart phone, the indication may be displayed on the screen with an indication such as "Authentic" or "Not Authentic" or similar language.

Steps 204 and 206, those of detecting and extracting a DWM payload, may comprise, as mentioned, using the camera 301 to detect one of more DWMs.

Step 208 that of Authenticating DWM payload, may comprise, as mentioned above, using the software in the smart phone to extract the DWM payload(s).

Step 210, is a step to determine whether the ID is authentic or not authentic.

Figure 5:
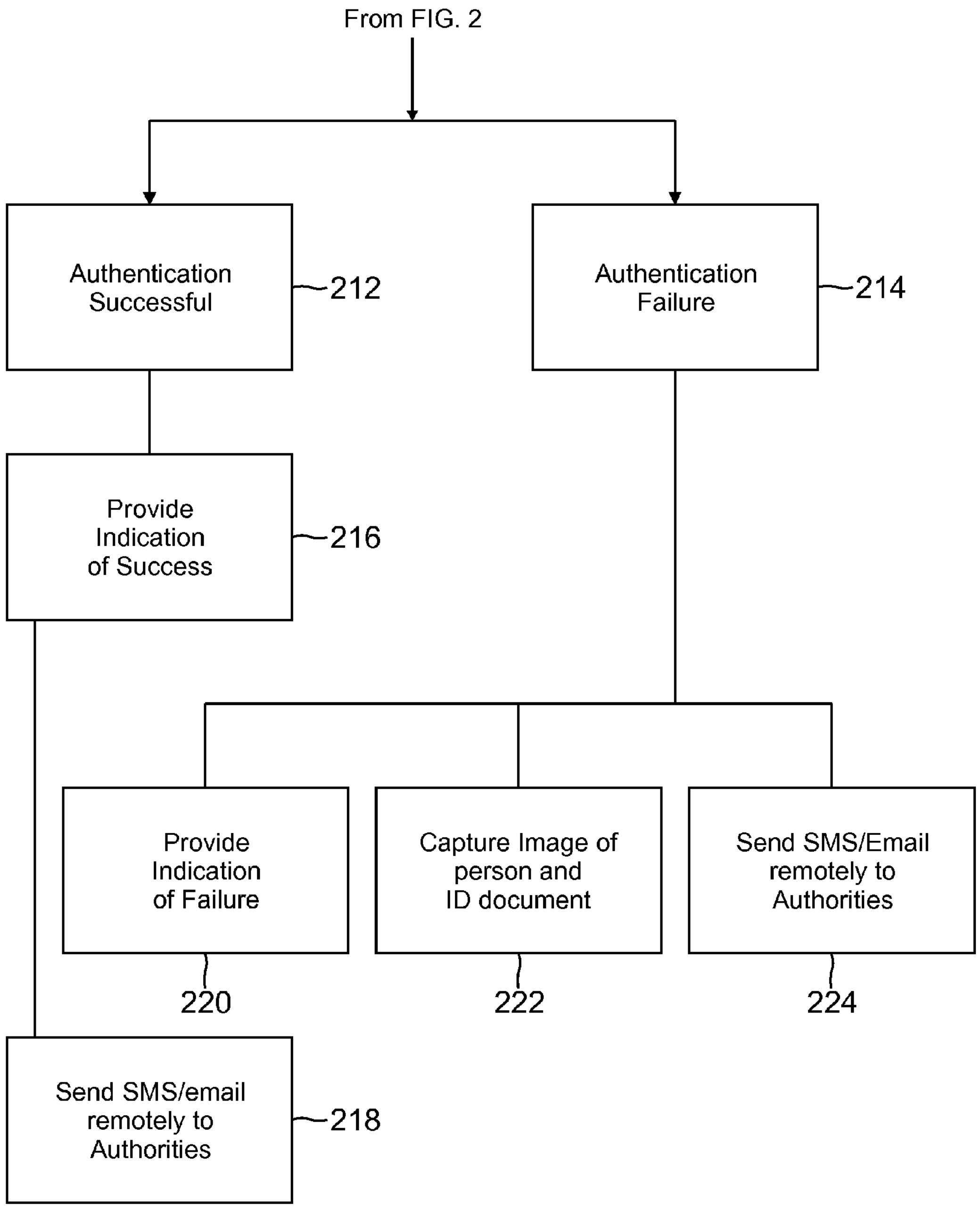
FIG. 5 is a flow chart which illustrates the process flow of the present invention from detection of the DWM through to analysis and actions once analyzed.

Turning now to FIG. 5 of the drawings, FIG. 5 depicts the flow of events after the steps of FIG. 2 to authenticate the document. In step 212, if the authentication is successful, then a visual or audio indication is given to the user that the authentication was successful. It may also be useful, as depicted in step 218, for the smart phone or tablet to remotely send either an SMS or e-mail remotely to third parties to indicate that the ID document was authentic. Prior to sending the SMS or e-mail, it is possible to capture an image of the person and/or the ID document itself to be stored in a third party facility, such as a governmental authority or a databank as well as in the smart phone or tablet.

In step 214, as shown in FIG. 5, an authentication failure is indicated. This may initiate a number of further actions as shown in steps 220, 222 and 224. In step 220, as in step 216, a visual and/or oral audio indication is provided to the user of the smart phone or tablet that there is a failure to authenticate the identification document. In step 222, an image is captured of the person seeking authentication as well as the ID doc itself and in step 224 the information that there has been a failure to authenticate as well as an image of the person and/or ID document may be sent remotely to a third party repository, such as a governmental authority for use and storage in a remote databank as well as in the smart phone or tablet.

In one embodiment of the invention, the method of FIG. 2 may be implemented using any device equipped with a camera, memory and processing capabilities, such as a mobile cellular telephone. The camera can capture red, green, blue (RGB) images with, by way of example only, three hundred dots per inch (dpi) resolution and twenty-four bit color depth.

Figure 4:
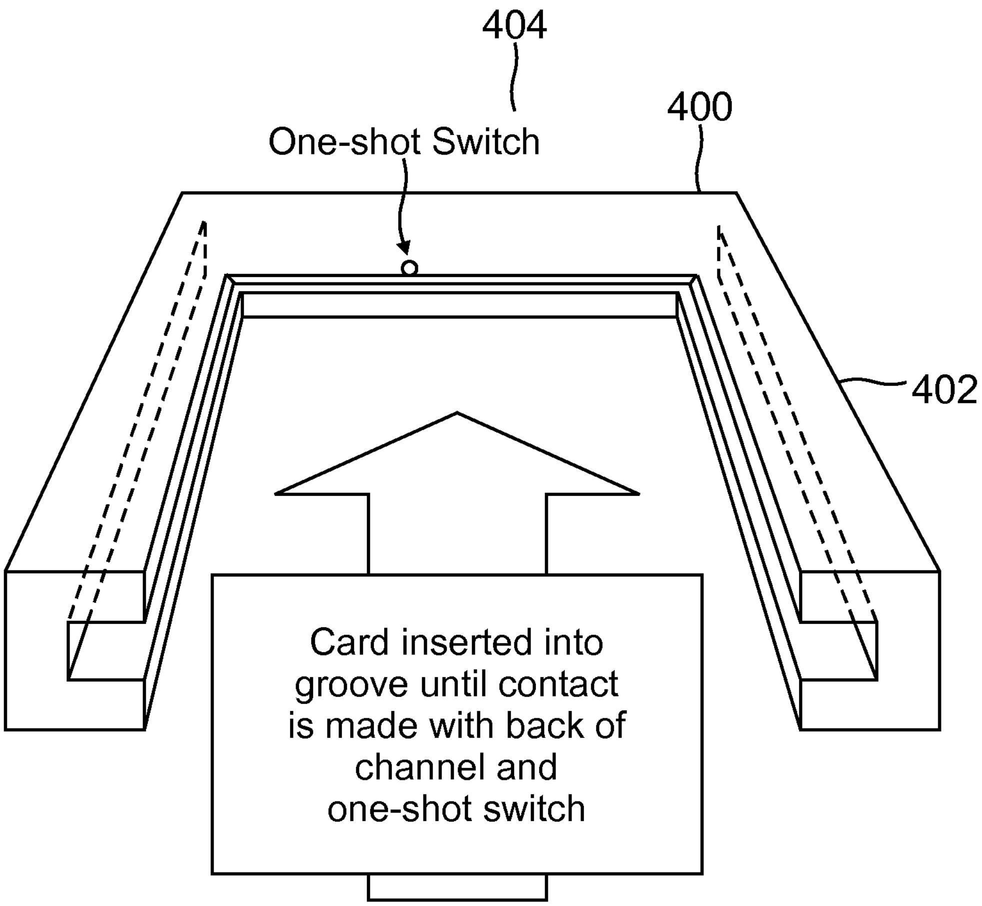
FIG. 4 illustrates an image capture device card fixture.

In one embodiment, the secure credential is aligned prior to image capture to minimize artifacts introduced by the rotation of the image during the payload extraction step. FIG. 4 illustrates one embodiment of the invention wherein a card fixture device is employed. The card fixture device 400 mounts to the smart phone or other visual inspection device and comprises grooves configured to hold a secure credential. As shown in FIG. 4, the card fixture 400 has a support structure 402 to hold the capture device in a fixed position relative to the secure credential. The card fixture may further comprise a switch 404 configured to sense when a card is inserted into the card fixture. When a card is inserted and triggers the switch 404, a signal may be sent to the smart phone or other visual inspection device to initiate capture of one or more images. The card fixture further allows for adjustment of the focal point for the capture device optics and lens. This mechanism also ensures the captured image is always centered.

It is envisioned that the software module which provides the ability to read and capture and analyze a DWM may be available either from a vendor or, possibly, from an "app store" that can be downloaded from the app store with suitable payment facilities. Of course, given the security sensitivity of the authentication process, the downloading of the app or the software module may be excluded from a public app store and access may be restricted to the user downloading the app and/or software module from an approved vendor or from a governmental authority. Updates to the software may be automatically sent to the smart phone or other portable device automatically in a "push" environment. It may also be envisioned that the smart phone or other portable device may be required to be purchased from the vendor preloaded with further security applications to prevent the smart phone, should it be lost or stolen, to be used by unauthorized parties. Further enhancements may prevent the software module from falling into the wrong hands by utilizing a function contained in certain smart phones to detect the theft of the smart phone or other device. Upon such detection of loss or of the device being stolen, the software module which authenticates the DWM would be automatically deleted from the device to prevent the software module from being acquired by an unauthorized third party.

Other embodiments are within the scope and spirit of the invention. For example, due to the nature of software, functions described above can be implemented using software, hardware, firmware, hardwiring, or combinations of any of these. Features implementing functions may also be physically located at various positions, including being distributed such that portions of functions are implemented at different physical locations.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

Many kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

Further, while the description above refers to the invention, the description may include more than one invention.

What is claimed is:

1. A handheld apparatus for assessing the authenticity of selected documents comprising:

one or more processors;

an image capture device in electronic communication with the one or more processors;

a data store coupled to the one or more processors having instructions stored thereon which, when executed by the one or more processors, causes the one or more processors to perform operations comprising:

receiving, from the image capture device, a digital image of a document, the document containing one or more digital watermarks (DWM);

extracting the one or more DWMs from the digital image of the document;

determining, based on analyzing the one or more DWMs, whether or not the document can be authenticated; and in response to determining whether or not the document can be authenticated, sending, to a third-party computing system, a notification indicating the authenticity of the document; and a U-shaped document positioning device detachably mounted to the handheld apparatus, the positioning device comprising a first side, a second side, and a bottom portion, wherein the first side and the second side comprise corresponding grooves for accepting a document, wherein the bottom portion comprises a sensor affixed to an inner wall of the bottom portion such that a document must be fully inserted into the document positioning device to trigger the sensor, and wherein the document positioning device is configured to hold the document in a fixed position relative to a lens of the image capture device wherein the document positioning device comprises an adjustment mechanism for adjusting a position of the document that is inserted in the document positioning device relative to the lens of the image capture device.

2. The apparatus of claim 1, wherein determining whether or not the document can be authenticated comprises determining that the document cannot be authenticated based on the one or more DWMs, and wherein the operations further comprise sending, to the third party computer system, the digital image of the document along with the notification indicating that the document cannot be authenticated.

3. The apparatus of claim 1, wherein at least one DWM includes payload data identifying a biometric trait of a document owner.

4. The apparatus of claim 1, wherein the sensor is in electronic communication with the one or more processors, the sensor configured to detect the presence of a document in the document positioning device, and wherein the operations further comprise:

receiving a signal from the sensor; and in response to receiving the signal, causing the image capture device to capture the digital image of the document.

5. The apparatus of claim 1, wherein the operations further comprise receiving, from the image capture device, a digital image of a person seeking authentication of the document, and wherein in response to determining whether or not the document can be authenticated, sending, to a third-party computing system, the notification indicating the authenticity of the document comprises sending, to a third-party computing system, the notification indicating the authenticity of the document and the image of the person.

6. A handheld apparatus for assessing the authenticity of selected documents comprising:

a U-shaped document positioning device detachably mounted to the handheld apparatus, the positioning device comprising a first side, a second side, and a bottom portion;

one or more processors;

an image capture device in electronic communication with the one or more processors;

a data store coupled to the one or more processors having instructions stored thereon which, when executed by the one or more processors, causes the one or more processors to perform operations comprising:

receiving, from the image capture device, a digital image of a document, the document containing one or more digital watermarks (DWM);

extracting the one or more DWMs from the digital image of the document;

determining, based on analyzing the one or more DWMs, whether or not the document can be authenticated; and in response to determining that the document is not authentic:

receiving, from the image capture device, a digital image of a person seeking authentication of the document, and sending 1) a notification indicating the authenticity of the document to a third party computing system and 2) the digital image of the person to a remote databank, wherein the first side and the second side comprise corresponding grooves for accepting a document, wherein the bottom portion comprises a sensor affixed to an inner wall of the bottom portion such that a document must be fully inserted into the document positioning device to trigger the sensor, and wherein the document positioning device is configured to hold the document in a fixed position relative to a lens of the image capture device wherein the document positioning device comprises an adjustment mechanism for adjusting a position of the document that is inserted in the document positioning device relative to the lens of the image capture device.

7. The apparatus of claim 6, wherein determining whether or not the document can be authenticated comprises determining that the document cannot be authenticated based on the one or more DWMs, and wherein the operations further comprise sending, to the third party computer system, the digital image of the document along with the notification indicating that the document cannot be authenticated.

8. The apparatus of claim 6, wherein at least one DWM includes payload data identifying a biometric trait of a document owner.

9. The apparatus of claim 6, wherein the sensor is in electronic communication with the one or more processors, the sensor configured to detect the presence of a document in the document positioning device, and wherein the operations further comprise:

receiving a signal from the sensor; and in response to receiving the signal, causing the image capture device to capture the digital image of the document.

10. A handheld apparatus for assessing the authenticity of selected documents comprising:

a U-shaped document positioning device detachably mounted to the handheld apparatus, the positioning device comprising a first side, a second side, and a bottom portion;

one or more processors;

an image capture device in electronic communication with the one or more processors;

a data store coupled to the one or more processors having instructions stored thereon which, when executed by the one or more processors, causes the one or more processors to perform operations comprising:

receiving, from the image capture device, a digital image of a document;

determining, based on analyzing the digital image of the document, that the document is not authentic; and in response to determining that the document is not authentic:

causing the image capture device to obtain a digital image of a person seeking authentication of the document, and sending 1) a notification indicating the authenticity of the document to a third party computing system and 2) the digital image of the person to a remote databank wherein the first side and the second side comprise corresponding grooves for accepting a document, wherein the bottom portion comprises a sensor affixed to an inner wall of the bottom portion such that a document must be fully inserted into the document positioning device to trigger the sensor, and wherein the document positioning device is configured to hold the document in a fixed position relative to a lens of the image capture device wherein the document positioning device comprises an adjustment mechanism for adjusting a position of the document that is inserted in the document positioning device relative to the lens of the image capture device.

11. The apparatus of claim 10, wherein the operations further comprise sending, to the third party computer system, the digital image of the document along with the notification indicating the document is not authentic and the digital image of the person.

12. The apparatus of claim 10, wherein the document contains one or more digital watermarks (DWM), wherein the operations further comprise extracting the one or more DWMs from the digital image of the document, and wherein determining that the document is not authentic comprises determining, based on analyzing the one or more DWMs, that the document is not authentic.

13. The apparatus of claim 12 wherein at least one DWM includes payload data identifying a biometric trait of a document owner.

14. The apparatus of claim 10, wherein the sensor is in electronic communication with the one or more processors, the sensor configured to detect the presence of a document in the document positioning device, and wherein the operations further comprise:

receiving a signal from the sensor; and in response to receiving the signal, causing the image capture device to capture the digital image of the document.

* * * * *